US011203389B2

(12) United States Patent
Hirayama

(10) Patent No.: US 11,203,389 B2
(45) Date of Patent: Dec. 21, 2021

(54) LEANING VEHICLE

(71) Applicant: YAMAHA HATSUDOKI KABUSHIKI KAISHA, Iwata (JP)

(72) Inventor: Yosuke Hirayama, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 111 days.

(21) Appl. No.: 16/701,907

(22) Filed: Dec. 3, 2019

(65) Prior Publication Data

US 2020/0102037 A1 Apr. 2, 2020

Related U.S. Application Data

(63) Continuation of application No. PCT/JP2018/032674, filed on Sep. 3, 2018.

(30) Foreign Application Priority Data

Sep. 4, 2017 (JP) .............................. JP2017-169755

(51) Int. Cl.
| | |
|---|---|
| *B62K 5/10* | (2013.01) |
| *B60G 21/00* | (2006.01) |
| *B62K 5/01* | (2013.01) |
| *B62K 5/08* | (2006.01) |
| *B62K 5/00* | (2013.01) |

(52) U.S. Cl.
CPC .............. *B62K 5/10* (2013.01); *B60G 21/007* (2013.01); *B62K 5/01* (2013.01); *B62K 5/08* (2013.01); *B60G 2200/156* (2013.01); *B60G 2300/124* (2013.01); *B62K 2005/001* (2013.01)

(58) Field of Classification Search
CPC ... B62K 5/10; B62K 5/01; B62K 5/08; B62K 2005/001; B60G 21/007; B60G 2200/156; B60G 2300/45; B62D 9/02
See application file for complete search history.

(56) References Cited

U.S. PATENT DOCUMENTS

| | | | | |
|---|---|---|---|---|
| 2010/0270765 A1* | 10/2010 | Choi | ........................ | B62D 9/02 |
| | | | | 280/93.51 |
| 2012/0181765 A1* | 7/2012 | Hill | ........................ | B62K 5/027 |
| | | | | 280/62 |
| 2014/0172286 A1* | 6/2014 | Moulene | .................. | B62K 5/10 |
| | | | | 701/124 |
| 2014/0312580 A1* | 10/2014 | Gale | ........................ | B62D 9/02 |
| | | | | 280/5.509 |
| 2018/0257706 A1* | 9/2018 | Kanehara | ............... | B62K 5/027 |

FOREIGN PATENT DOCUMENTS

| | | | | |
|---|---|---|---|---|
| DE | 102013223981 A1 * | 6/2014 | ............... | B62K 5/10 |
| JP | 2010-052666 A | 3/2010 | | |
| JP | 2013-144513 A | 7/2013 | | |
| JP | 2017-095088 A | 6/2017 | | |
| WO | 2006/130007 A2 | 12/2006 | | |

* cited by examiner

*Primary Examiner* — Drew J Brown
(74) *Attorney, Agent, or Firm* — Rabin & Berdo, P.C.

(57) ABSTRACT

A leaning vehicle is equipped with a double wishbone (DWB) type suspension apparatus capable of improving comfort felt by an operator In the leaning vehicle, a connecting member is provided such that a first distance is smaller than a second distance. A distance from the connecting member to a hip point of an operator seat in a leaning-vehicle front-back direction is larger than a distance from the connecting member to a rotational center axis of each axle of a left rear wheel and a right rear wheel in the leaning vehicle front-back direction.

11 Claims, 6 Drawing Sheets

LEANING VEHICLE

CROSS-REFERENCE TO RELATED APPLICATIONS

This application is a continuation of International Application PCT/JP2018/032674 filed on Sep. 3, 2018, which claims priority from Japanese Patent Application No. 2017-169755 filed on Sep. 4, 2017. The contents of each of the identified applications are entirely incorporated herein by reference.

BACKGROUND

Technical Field

The present teaching relates to a leaning vehicle including a leaning body that leans in a leftward direction when turning left and leans in a rightward direction when turning right.

Background Art

Conventionally, there is known a leaning vehicle including a leaning body that leans in a leftward direction when turning left and leans in a rightward direction when turning right. Such a leaning vehicle is disclosed in, for example, International Application Publication No. WO2006/130007.

The leaning vehicle described in the above described publication includes a leaning body which leans in a leftward direction when turning left and leans in a rightward direction when turning right, left and right rear wheels which are disposed side by side with each other in a leaning-vehicle left-right direction, and a suspension apparatus which supports the left and right rear wheels to the leaning body. Here, in the leaning vehicle described in the above described publication, a double wishbone suspension (hereinafter, referred to as DWB) type suspension apparatus is adopted as the suspension apparatus for supporting the left and right rear wheels to the leaning body.

CITATION LIST

Patent Literature

[Patent Literature 1] International Application Publication No. WO2006/130007

SUMMARY OF THE INVENTION

The inventor of the present application has conducted a study on a leaning vehicle which supports the left and right rear wheels by a leaning body by a DWB type suspension apparatus according to the above described publication. As a result, he has found that in such a leaning vehicle, there is a difference in comfort felt by the operator of the leaning vehicle during operation of the leaning vehicle between comfort felt during straight running and comfort felt during turning of the leaning vehicle.

It is an object of the present teaching to provide a leaning vehicle including a DWB type suspension apparatus which is capable of improving comfort felt by the operator.

The inventor of the present application has conducted a study on a leaning vehicle which supports the left and right rear wheels to the leaning body by a DWB type suspension apparatus according to the above described publication. As a result, the inventor has found that in such a leaning vehicle, there is a difference in comfort felt by the operator of the leaning vehicle during operation of the leaning vehicle between comfort felt during straight running and comfort felt during turning of the leaning vehicle. Accordingly, the inventor has conducted a more detailed study on a mechanism by which such difference is caused.

First, the inventor has conducted a study on the configuration of a leaning vehicle in which left and right rear wheels are supported by a leaning body by a DWB type suspension apparatus according to the above described publication. Such a leaning vehicle includes a leaning body, left and right arms, left and right shock absorbers, a connecting member, left and right wheels, and an operator seat. Here, the leaning body leans in a leaning-vehicle leftward direction when turning left, and leans in a leaning-vehicle rightward direction when turning right. The left arm includes a left upper arm and a left lower arm which are swingably supported by the leaning body and extend in a leaning-vehicle leftward direction from the leaning body. The right arm includes a right upper arm and a right lower arm which are swingably supported by the leaning body and extend in a leaning-vehicle rightward direction from the leaning body. The left shock absorber has its first end part swingably connected to the left arm, and its second end part swingably connected to the connecting member. The right shock absorber has its first end part swingably connected to the right arm, and its second end part swingably connected to the connecting member. The connecting member is supported by the leaning body in a swingable state. The left wheel is supported by the left arm. The right wheel is supported by the right arm. The operator seat is supported by the leaning body and leans along with the leaning body when the leaning vehicle turns, and the operator sits thereon during operation of the leaning vehicle.

In such a leaning vehicle, force received by the left wheel from the road surface is damped by the left shock absorber and is thereafter transferred to the operator seat via the connecting member and the leaning body. Also, force received by the right wheel from the road surface is damped by the right shock absorber and is thereafter transferred to the operator seat via the connecting member and the leaning body. That is, force received by the wheel from the road surface is damped by the shock absorber and is thereafter transferred to the operator seat supported by the leaning body via the connecting member to which the shock absorber is connected, and the leaning body to which the connecting member is supported.

The inventor of the present application has conducted a study on comfort felt by the operator sitting on the operator seat in such a leaning vehicle. As a result, he has noticed that the operator sitting on the operator seat is more likely to feel force received from the road surface by the wheel closer to the hip point of the operator seat in a leaning-vehicle front-back direction. That is, comfort felt by the operator sitting on the operator seat is affected by the force received from the road surface by the wheel closer to the hip point of the operator seat in the leaning-vehicle front-back direction.

Moreover, the inventor also has noticed that since the forces received by the wheels from the road surface are damped by the shock absorbers as described above, the operator sitting on the operator seat is likely to feel a damping effect of the shock absorber against the force received from the road surface by the wheel closer to the hip point of the operator seat in a leaning-vehicle front-back direction. That is, it has been revealed that the operator sitting on the operator seat is likely to feel the difference in damping by the shock absorber between damping when the leaning vehicle is running straight and damping when the leaning vehicle is turning.

Based on these findings, the inventor of the present application has conducted a further study. As a result, he has noticed that by devising a positional relation between the hip point of the operator seat and the connecting member in a leaning-vehicle front-back direction while reducing the difference between the damping effect by the shock absorber when the leaning vehicle is running straight and the damping effect by the shock absorber when the leaning vehicle is turning, it is possible to improve comfort felt by the operator. The present teaching has been completed based on these findings.

A leaning vehicle according to an embodiment of the present teaching includes a leaning body, a left arm, a right arm, a left shock absorber, a right shock absorber, a connecting member, a first left wheel, a first right wheel, a second wheel, and an operator seat. The leaning body leans in a leaning-vehicle leftward direction when turning left, and leans in a leaning-vehicle rightward direction when turning right. The left arm includes a left upper arm and a left lower arm, which are swingably supported by the leaning body and extend in a leaning-vehicle leftward direction from the leaning body. The right arm includes a right upper arm and a right lower arm, which are swingably supported by the leaning body and extend in a leaning-vehicle rightward direction from the leaning body. The left shock absorber has its first end part connected to the left arm in a state of being swingable around a first left swing-center axis lying along a leaning-vehicle front-back direction. The right shock absorber has its first end part connected to the right arm in a state of being swingable around a first right swing-center axis lying along the leaning-vehicle front-back direction. The connecting member is supported by the leaning body in a state of being swingable around a front-back swing-center axis lying along the leaning-vehicle front-back direction, and connects a second end part of the left shock absorber and a second end part of the right shock absorber to the leaning body, respectively. The connecting member includes a left connecting part and a right connecting part. The second end part of the left shock absorber is connected to the left connecting part in a state of being swingable around a second left swing-center axis lying along the leaning-vehicle front-back direction. The second end part of the right shock absorber is connected to the right connecting part in a state of being swingable around a second right swing-center axis lying along the leaning-vehicle front-back direction. The first left wheel is supported by the left arm. The second right wheel is supported by the right arm and is provided at a position side-by-side with the first left wheel in a leaning-vehicle left-right direction. The second wheel is provided in front of, or behind, the first left wheel and the first right wheel in the leaning-vehicle front-back direction. The operator seat is supported by the leaning body, and leans along with the leaning body when the leaning vehicle turns, with the operator of the leaning vehicle sitting thereon during operation of the leaning vehicle. The operator seat is arranged such that its hip point is located between the first left wheel and the first right wheel, and the second wheel in the leaning-vehicle front-back direction. The operator seat is disposed at a position where a distance from its hip point to a rotational center axis of each axle of the first left wheel and the first right wheel in the leaning-vehicle front-back direction is smaller than a distance from the hip point to a rotational center axis of the axle of the second wheel. The force received by the first left wheel from the road surface is damped by the left shock absorber and is transferred to the operator seat via the connecting member and the leaning body. The force received by the first right wheel from the road surface is damped by the right shock absorber and is transferred to the operator seat via the connecting member and the leaning body. The connecting member is formed such that a first distance is smaller than a second distance. The first distance is a distance from a middle point of a first line segment to a front-back swing-center axis which is a swing center with respect to the leaning body of the connecting member. The first line segment is a line segment linking a third left swing-center axis, which is a swing center with respect to the leaning body of one of the left upper arm and the left lower arm to which the first end part of the left shock absorber is connected, with a third right swing-center axis, which is a swing center with respect to the leaning body of one of the right upper arm and the right lower arm to which the first end part of the right shock absorber is connected, as viewed in a leaning-vehicle frontward or backward direction. The second distance is a distance from the middle point of a second line segment to the middle point of the first line segment. The second line segment is a line segment linking a fourth left swing-center axis, which is a swing center with respect to the leaning body of the other of the left upper arm and the left lower arm to which the first end part of the left shock absorber will not be connected, with a fourth right swing-center axis, which is a swing center with respect to the leaning body of the other of the right upper arm and the right lower arm, to which the first end part of the right shock absorber will not be connected, as viewed in a leaning-vehicle frontward or backward direction. The connecting member is disposed at a position where the distance from the connecting member to the hip point of the operator seat is larger than the distance from the connecting member to the rotational center axis of each axle of the first left wheel and the first right wheel, in the leaning-vehicle front-back direction.

According to the above described leaning vehicle, the first end part of the left shock absorber is connected to the left arm which supports the first left wheel, and the second end part of the left shock absorber is connected to the connecting member. Moreover, the first end part of the right shock absorber is connected to the right arm that supports the first right wheel, and the second end part of the right shock absorber is connected to the connecting member. The force received by the first left wheel from the road surface is damped by the left shock absorber and is thereafter transferred to the connecting member, and the force received by the first right wheel from the road surface is damped by the right shock absorber and is thereafter transferred to the connecting member. That is, the force received by the first left wheel from the road surface is damped by the left shock absorber before being transferred to the connecting member, and the force received by the first right wheel from the road surface is damped by the right shock absorber before being transferred to the connecting member.

Here, the distance from the connecting member to the hip point in the operator seat in the leaning-vehicle front-back direction is larger than the distance from the connecting member to the rotational center axis of each axle of the first left wheel and the first right wheel in the leaning-vehicle front-back direction. That is, the operator seat is disposed at a position apart from the connecting member to which the force received by the first left wheel from the road surface and the force received by the first right wheel from the road surface are transferred. For that reason, the force transferred to the operator seat via the leaning body that supports the connecting member (that is, the force received by the first left wheel from the road surface and damped by the left shock absorber, and the force received by the first right wheel from the road surface and damped by the right shock absorber) will be further weakened. Therefore, it is possible to improve comfort felt by the operator who sits on the operator seat.

Moreover, in the leaning-vehicle up-down direction, the front-back swing-center axis which is the swing center with respect to the leaning body of the connecting member is positioned close to the third left swing-center axis which is the swing center with respect to the leaning body of one of the left upper arm and the left lower arm to which the first end part of the left shock absorber is connected, and the third right swing-center axis which is the swing center with respect to the leaning body of one of the right upper arm and the right lower arm to which the first end part of the right shock absorber is connected. As a result of that, the angle of a straight line (left expansion/contraction axis), which extends in an expansion/contraction direction of the left shock absorber, with respect to one of the left upper arm and the left lower arm, to which the first end part of the left shock absorber is connected, will hardly change between the angle during straight running and the angle during turning of the leaning vehicle. Similarly, the angle of a straight line (right expansion/contraction axis), which extends in an expansion/contraction direction of the right shock absorber, with respect to one of the right upper arm and the right lower arm, to which the first end part of the right shock absorber is connected, will hardly change between the angle during straight running and the angle during turning of the leaning vehicle. Therefore, the left shock absorber and the right shock absorber expand and contract respectively in a similar manner during straight running and during turning of the leaning vehicle. In other words, an expansion amount (lever ratio) of the left shock absorber with respect to a swing angle of one of the left upper arm and the left lower arm, to which the first end part of the left shock absorber is connected, and an expansion amount (lever ratio) of the right shock absorber with respect to a swing angle of one of the right upper arm and the right lower arm, to which the first end part of the right shock absorber is connected, are hardly different from each other during straight running and during turning of the leaning vehicle. Therefore, in the above described leaning vehicle, it is possible to further improve comfort felt by the operator sitting on the operator seat by reducing the difference between the damping effect by the left shock absorber and the right shock absorber when the leaning vehicle is running straight, and the damping effect by the left shock absorber and the right shock absorber when the leaning vehicle is turning.

Note that in the above described leaning vehicle, the first distance may be zero. That is, the front-back swing-center axis which is the swing center with respect to the leaning vehicle of the connecting member may be located on the first line segment as viewed in a leaning-vehicle frontward direction or backward direction in a state in which the leaning body is standing upright.

In the above described leaning vehicle, the connecting member may be formed such that the first distance is smaller than the third distance in a state in which the leaning body is standing upright. The third distance is a distance from the third left swing-center axis which is the swing center with respect to the leaning body of one of the left upper arm and the left lower arm, to which the first end part of the left shock absorber is connected, to the third right swing-center axis which is the swing center with respect to the leaning body of one of the right upper arm and the right lower arm, to which the first end part of the right shock absorber is connected, as viewed in a leaning-vehicle frontward direction or backward direction.

In the above described leaning vehicle, the connecting member may be supported by the leaning body in a state of being swingable around the front-back swing-center axis in such a way to satisfy the following (1) or (2).

(1) The first end part of the left shock absorber is connected to the left lower arm included in the left arm; the first end part of the right shock absorber is connected to the right lower arm included in the right arm; the third left swing-center axis is the swing center with respect to the leaning body of the left lower arm; and the third right swing-center axis is the swing center with respect to the leaning body of the right lower arm.

(2) The first end part of the left shock absorber is connected to the left upper arm included in the left arm; the first end part of the right shock absorber is connected to the right upper arm included in the right arm; the third left swing-center axis is the swing center with respect to the leaning body of the left upper arm; and the third right swing-center axis is the swing center with respect to the leaning body of the right upper arm.

In the above described leaning vehicle, one of the connecting member and the leaning body may have a swing support shaft for supporting the connecting member, the swing support shaft supported by the leaning body in a state of being swingable around the front-back swing-center axis. In this case, the swing support shaft may be overlapped on the first line segment as viewed in a leaning-vehicle frontward direction or backward direction.

In the above described leaning vehicle, the front-back swing-center axis may be present at a position corresponding to the middle point of the first line segment as viewed in the leaning-vehicle frontward direction or backward direction.

In the above described leaning vehicle, the first left wheel and the first right wheel may be adapted to lean in a leaning-vehicle leftward direction when turning left, and lean in a leaning-vehicle rightward direction when turning right, along with the leaning body. In other words, the first left wheel and the first right wheel may be adapted to lean respectively along with the leaning body when the leaning vehicle turns.

In a leaning vehicle in which the first left wheel and the first right wheel lean respectively with the leaning body when the leaning vehicle turns, the connecting member may be formed such that a fourth distance is smaller than the first distance in a state in which the leaning body is standing upright. The fourth distance is a distance from the second left swing-center axis which is the swing center with respect to the connecting member of the second end part of the left shock absorber to the second right swing-center axis which is the swing center with respect to the connecting member of the second end part of the right shock absorber as viewed in a leaning-vehicle frontward direction or backward direction.

In the above described leaning vehicle, the first left wheel and the first right wheel may be disposed further backward than a second wheel as viewed in a leaning-vehicle leftward direction or rightward direction.

In an aspect in which the first left wheel and the first right wheel are disposed further backward than the second wheel, the second wheel may be a steerable wheel.

In an aspect in which the first left wheel and the first right wheel are disposed further backward than the second wheel, the second wheel may include a second left wheel and a second right wheel which is provided at a position side-by-side with the second left wheel in a leaning-vehicle left-right direction.

In the above described leaning vehicle, the connecting member may be formed in such a way to extend in a leaning-vehicle up-down direction in a state in which the leaning body is standing upright. In this case, the front-back swing-center axis may be located further downward than the second left swing-center axis and the second right swing-center axis.

The above described object and other objects, features, aspects and advantages will become further obvious from detailed description of embodiments of the present teaching provided in relation to the appended drawings.

As used herein, the term "and/or" includes any and all combinations of one or more of the associated listed items.

It will be further understood that the terms "including", "comprising" or "having" and variations thereof when used in this specification, specify the presence of stated features, steps, operations, elements, components, and/or their equivalents but do not preclude the presence or addition of one or more other features, steps, operations, elements, components, and/or groups thereof.

Unless otherwise defined, all the terms (including technical and scientific terms) used herein have the same meanings as commonly understood by one having ordinary skill in the art to which this teaching belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the teaching, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the teaching and the claims.

In the following description, for purposes of explanation, numerous specific details are set forth in order to provide a thorough understanding of the present teaching. It will be evident, however, to one skilled in the art that the present teaching may be practiced without these specific details. The present disclosure is to be considered as an exemplification of the teaching, and is not intended to limit the teaching to the specific embodiments illustrated by the figures or description below.

Advantageous Effects of Invention

According to the leaning vehicle of the present teaching, it is possible to improve comfort felt by the operator.

DETAILED DESCRIPTION

Hereinafter, embodiments of the present teaching will be described with reference to the drawings. Note that the embodiments to be described below are merely exemplary, and the present teaching will not be limited to the embodiments to be described below.

Figure 1:
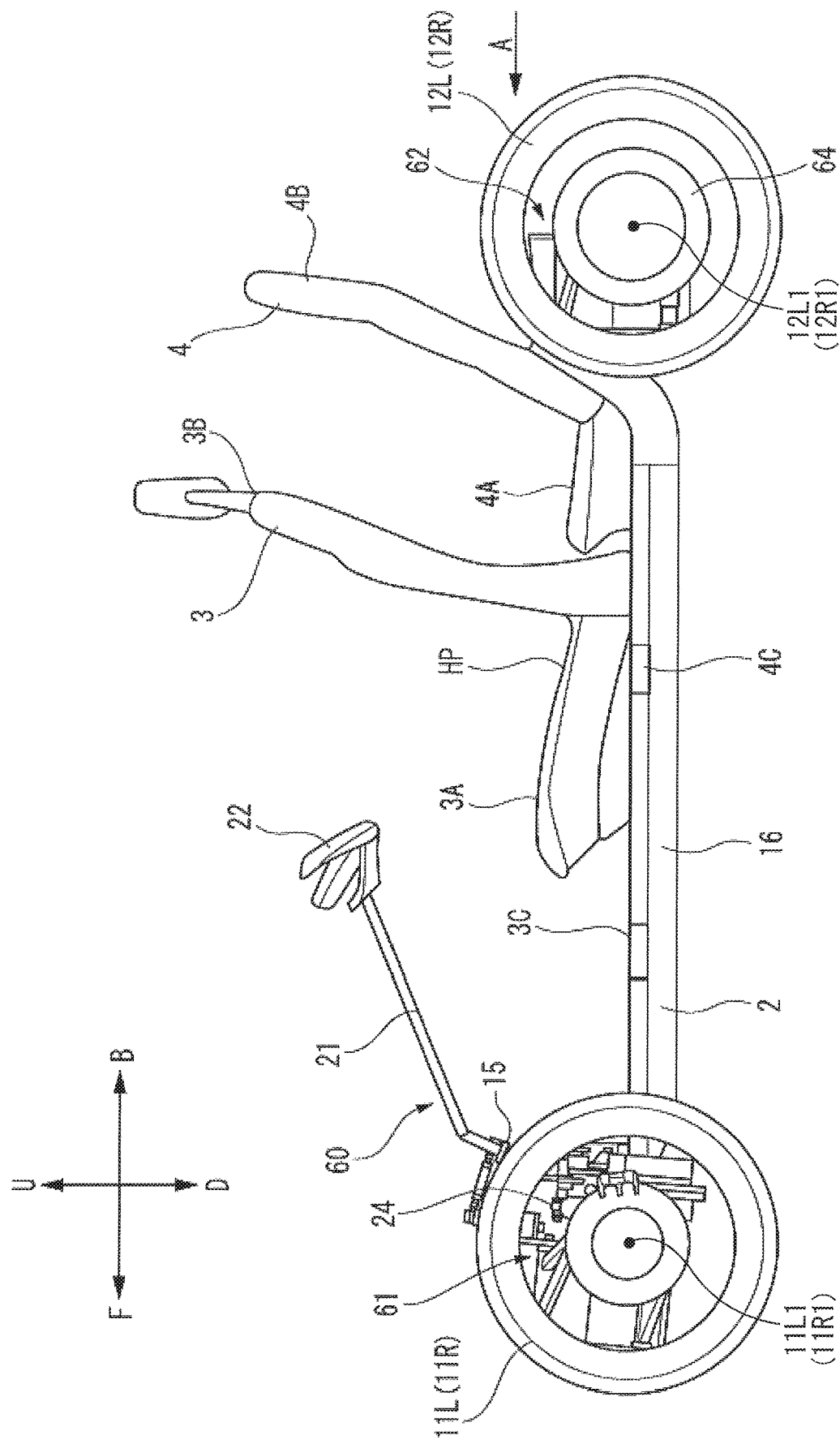
FIG. 1 is a left side view to show a general configuration of a leaning vehicle according to an embodiment of the present teaching, showing a state in which external components such as a cover are removed.
Figure 2:
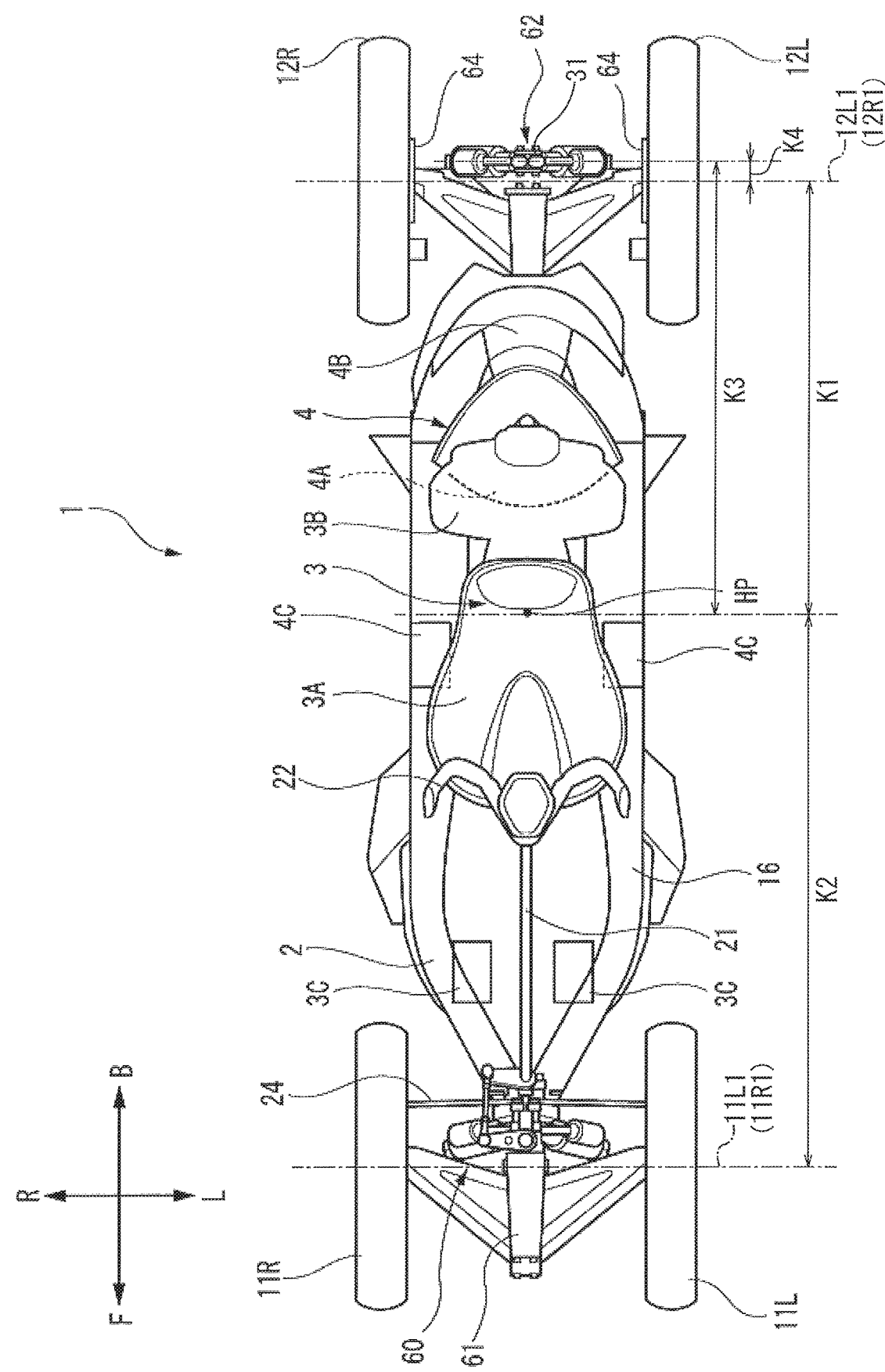
FIG. 2 is a top view of the leaning vehicle shown in FIG. 1.
Figure 3:
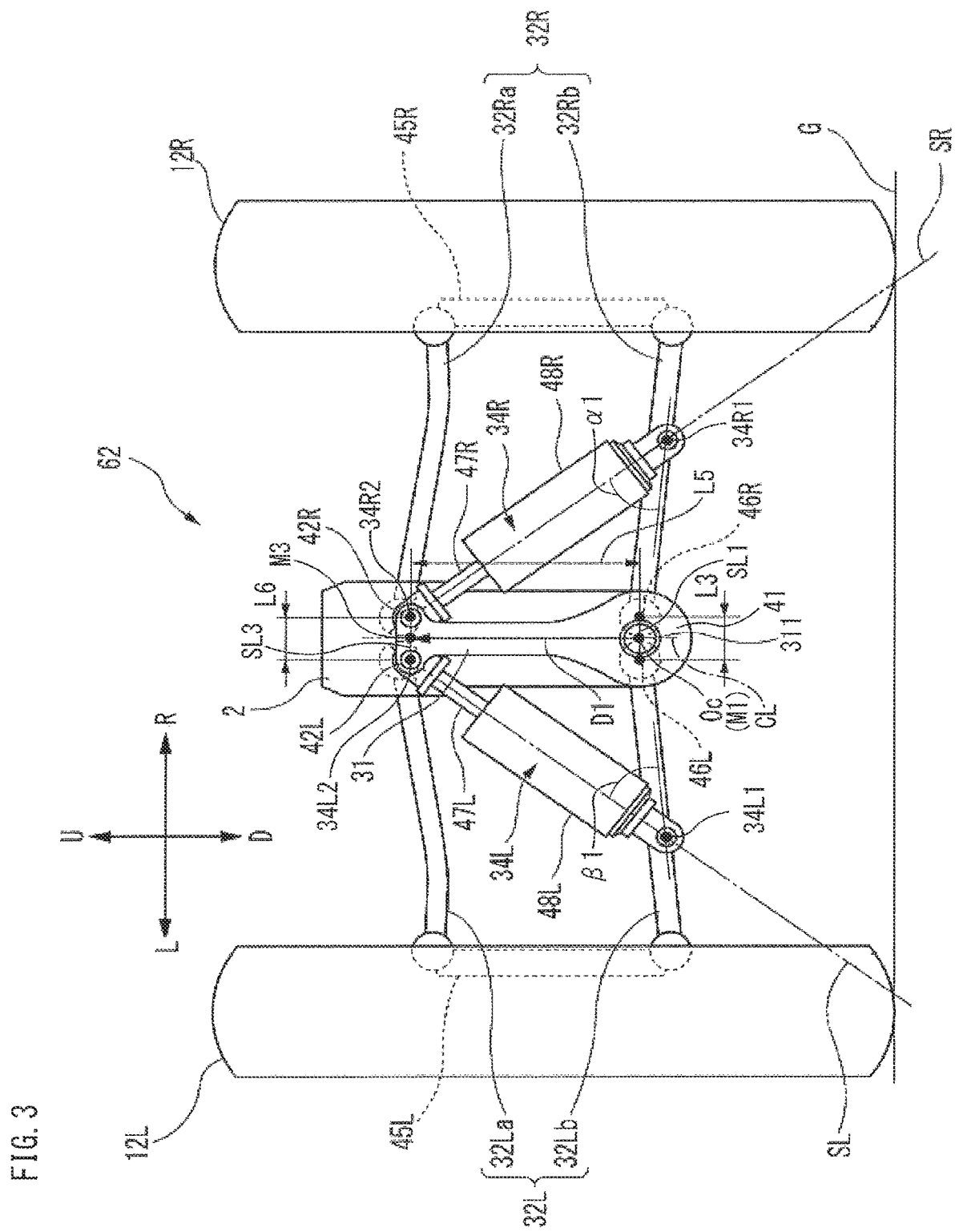
FIG. 3 is a view from arrow A in FIG. 1 in a state in which the leaning vehicle is standing upright.
Figure 4:
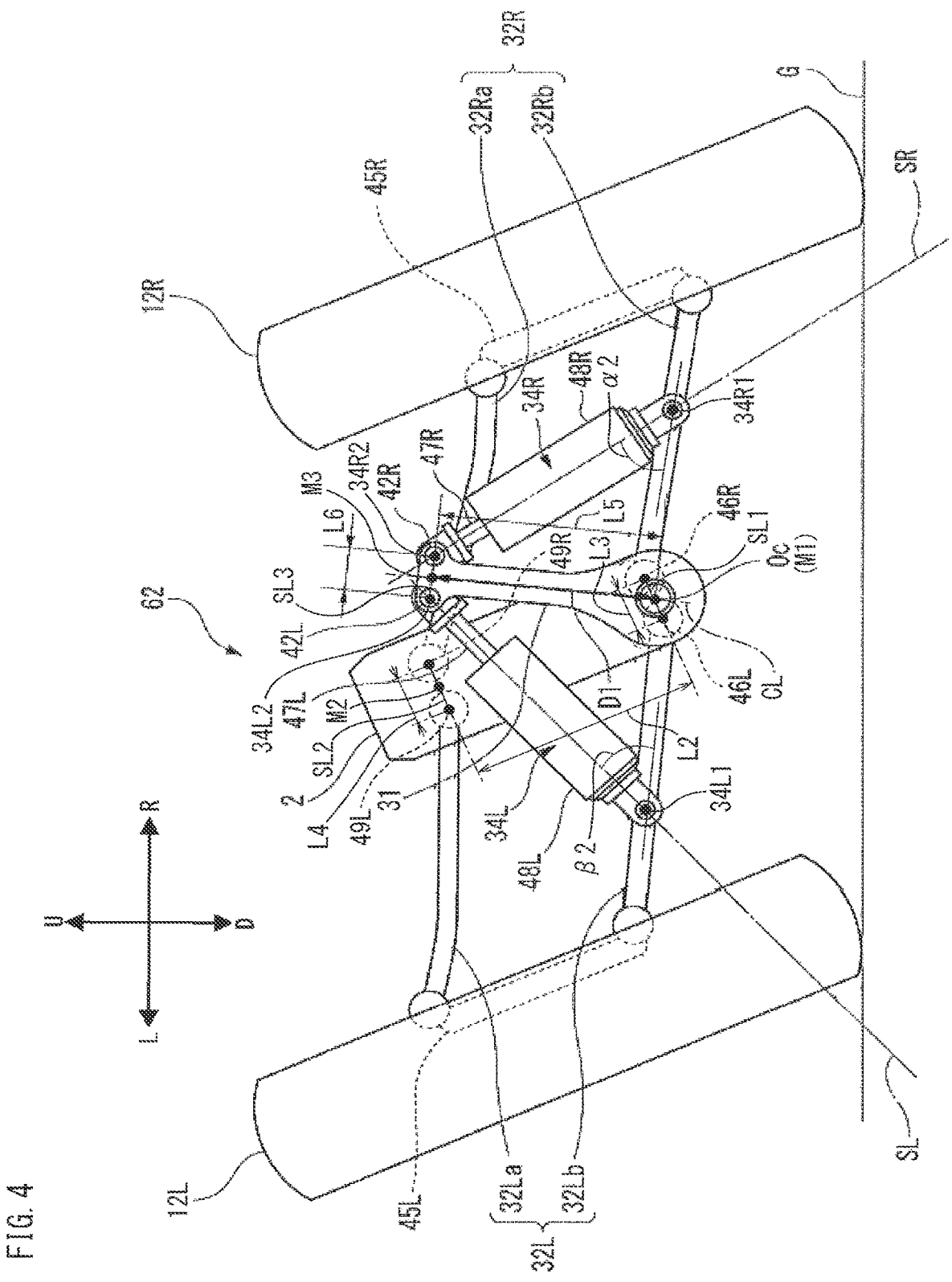
FIG. 4 is a view from arrow A in FIG. 1 in a state in which the leaning vehicle is leaning in a leaning-vehicle leftward direction.
Figure 7:
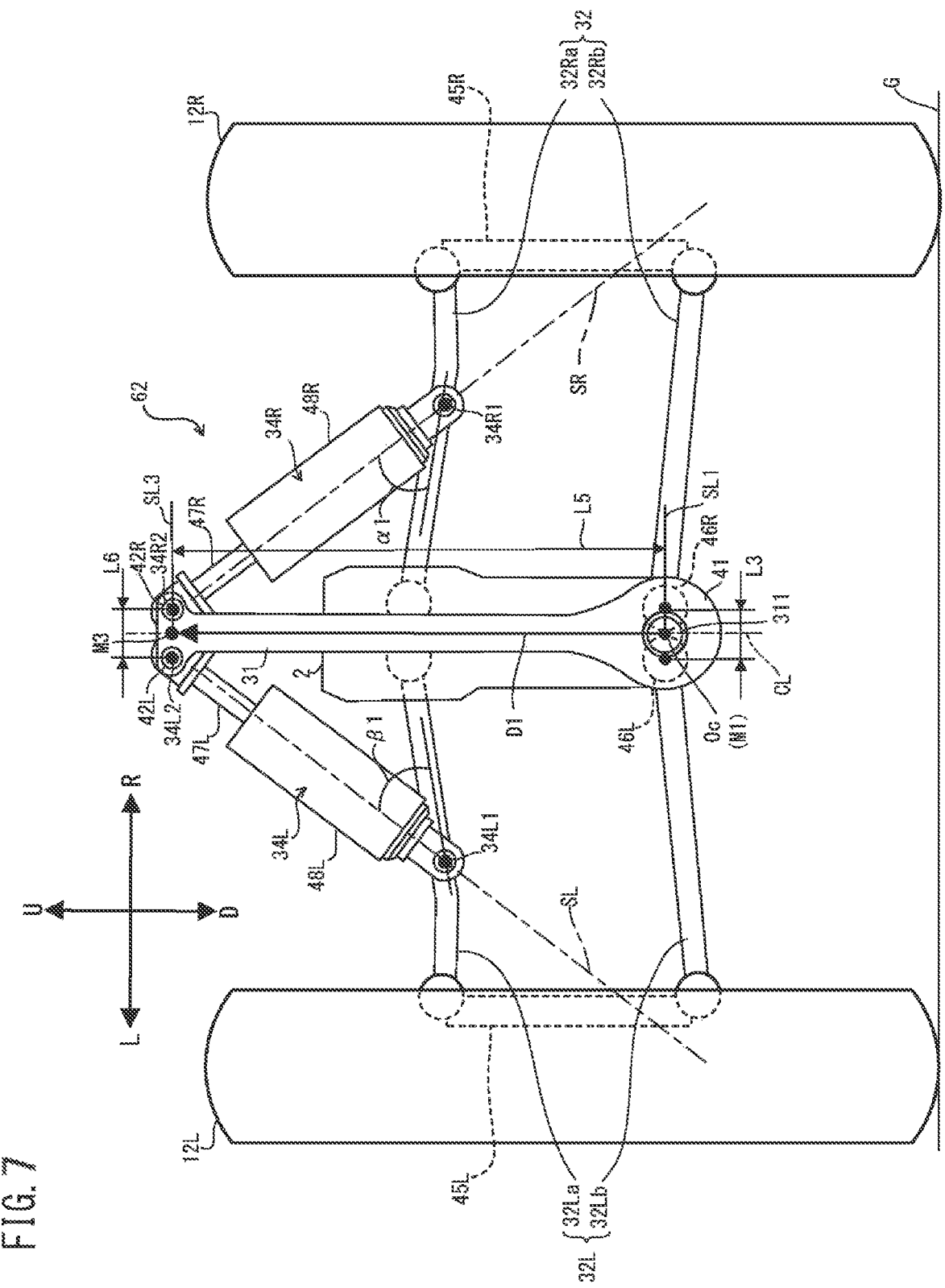
FIG. 7 is a view from arrow A in FIG. 1 in a state in which the leaning vehicle is standing upright, according to an alternative embodiment.

FIG. 1 is a left side view to show a general configuration of a leaning vehicle 1 according to an embodiment of the present teaching, showing a state in which external components such as a cover are removed. FIG. 2 is a top view of the leaning vehicle 1 shown in FIG. 1. FIG. 3 is a view from arrow A in FIG. 1 in a state in which the leaning vehicle 1 is standing upright. FIG. 4 is a view from arrow A in FIG. 1 in a state in which the leaning vehicle 1 is leaning in a leaning-vehicle leftward direction. FIG. 7 is a view from arrow A in FIG. 1 in a state in which the leaning vehicle is standing upright, according to an alternative embodiment.

As shown in FIG. 2, the leaning vehicle 1 according to the present embodiment is a four wheel vehicle including two front wheels 11L, 11R and two rear wheels 12L, 12R.

Note that a "leaning vehicle" in the present description refers to a vehicle in which a body frame 2 is capable of leaning with respect to the ground surface, and relative position of the body frame 2 in an up-down direction changes as the body frame 2 leans. Unless otherwise stated, "front", "back", "left", "right", "up", and "down" respectively mean front, back, left, right, up, and down as viewed from an occupant seated on an operator seat 3 when the leaning vehicle 1 rests on the horizontal surface in a non-steering state.

Symbols "F", "B", "L", "R", "U", "D" in the drawings respectively denote "front", "back", "left", "right", "up", and "down".

In the present description, "a vehicle-body front-back direction", "a vehicle-body up-down direction", and "a vehicle-body left-right direction" mean a front-back direction, an up-down direction, and a left-right direction with reference to the body frame 2. When the steering is in a non-steered state and the body frame 2 is in an upright state, the front-back direction, the up-down direction, and the left-right direction of the body frame 2 correspond to the front-back direction, the up-down direction, and the left-right direction of the leaning vehicle 1, respectively. However, when the steering is in a steered state or the body frame 2 is in a leaning state, the front-back direction, the up-down direction, and the left-right direction of the body frame 2 may differ from the front-back direction, the up-down direction, and the left-right direction of the leaning vehicle 1, respectively.

In the present description, "an axis extending in a front-back direction" (or, "an axis lying along a front-back direction") includes not only an axis that extends in a direction parallel with the front-back direction, but also an axis that extends in a direction inclined at an angle in a range of −45° to +450 with respect to the front-back direction. In a similar manner, "an axis extending in an up-down direction" (or "an axis lying along an up-down direction") and "an axis extending in a left-right direction" (or "an axis lying along a left-right direction") respectively include an axis that extends in a direction inclined at an angle in a range of −45° to +45° with respect to the up-down direction, and an axis that extends in a direction inclined at an angle in a range of −45° to +45° with respect to the left-right direction.

In the present description, the phrase "a first member is disposed further forward than a second member" refers to the following state. The first member is disposed in front of a plane which passes through a front end of the second member and is orthogonal to a front-back direction. In this case, the first member and the second member may be aligned or may not be aligned in the front-back direction. This definition will be applied to directions other than the front-back direction. Note that the first member and the second member each refer to a member which constitutes a leaning vehicle 1.

In the present description, the phrase "a first member is disposed in front of a second member" refers to the following state. At least a part of the first member is disposed in a region over which the second member passes when it is moved in parallel with a frontward direction. Therefore, the first member may fit in the region over which the second member passes when it is moved in parallel with the frontward direction or may protrude from the region through which the second member passes when it is moved in parallel with the frontward direction. In this case, the first member and the second member are aligned in the front-back direction. This definition will be applied to directions other than the front-back direction. Note that the first member and the second member each refer to a member which constitutes the leaning vehicle 1.

In the present specification, unless otherwise stated, each part of the first member is defined as follows. A front part of the first member means a front half of the first member. A rear part of the first member means a back half of the first member. A left part of the first member means a left half of the first member. A right part of the first member means a right half of the first member. An upper part of the first member means an upper half of the first member. A lower part of the first member means a lower half of the first member. The upper end of the first member means an end of the first member in the upward direction. The lower end of the first member means an end of the first member in the downward direction. The front end of the first member means an end of the first member in the frontward direction. The rear end of the first member means an end of the first member in the backward direction. The right end of the first member means an end of the first member in the rightward direction. The left end of the first member means an end of the first member in the leftward direction. The upper end part of the first member means the upper end and its vicinity of the first member. The lower end part of the first member means the lower end and its vicinity of the first member. The front end part of the first member means the front end and its vicinity of the first member. The back end part of the first member means the back end and its vicinity of the first member. The right end part of the first member means the right end and its vicinity of the first member. The left end part of the first member means the left end and its vicinity of the first member. The first member means a member constituting the leaning vehicle 1.

As shown in FIGS. 1 and 2, a leaning vehicle 1 includes a body frame 2 as a leaning body, an operator seat 3, and a rear seat 4.

The body frame 2 is a member that mainly receives stress in the leaning vehicle 1. The body frame 2 may be a frame obtained by combining a plurality of components, or integrally forming a plurality of components. Moreover, the material of the body frame 2 may be a metal such as aluminum and iron, a synthetic resin such as CFRP (Carbon Fiber Reinforced Polymer Composites), or combinations thereof. Further, the body frame 2 may be a monocoque structure constituted by external components of the leaning vehicle 1, or a semi-monocoque structure a part of which also serves as an external component of the leaning vehicle 1.

Note that middle parts in a left-right direction of a body frame 2 are a left middle part and a right middle part when the length of the body frame 2 is divided into four equal parts: a left end part, a left middle part, a right middle part, and a right end part in the body-frame (2) left-right direction. A middle part in a left-right direction of a body frame 2 is an area that includes a center in the left-right direction of the body frame 2.

The body frame 2 includes a head pipe 15 and a main frame 16. The head pipe 15 extends in a backward and obliquely upward direction as viewed in a leaning-vehicle (1) leftward direction or rightward direction. That is, the center of an upper end of the head pipe 15 is located further backward than the center of a lower end of the head pipe 15. The head pipe 15 extends in a body-frame (2) up-down direction as viewed in a leaning-vehicle (1) frontward direction or backward direction. The main frame 16 extends in a backward direction from the head pipe 15 as viewed in a leaning-vehicle (1) leftward direction or rightward direction. The main frame 16 has its back end part extending to an obliquely upward direction.

The body frame 2 is capable of leaning in a leaning-vehicle (1) left-right direction. The body frame 2 leans in a leaning-vehicle (1) leftward direction when the leaning vehicle 1 turns left, and leans in a leaning-vehicle (1) rightward direction when the leaning vehicle 1 turns right. The main frame 16 leans in a leaning-vehicle (1) left-right direction as the body frame 2 leans.

An operator seat 3 is mounted on the body frame 2. That is, the operator seat 3 is supported by the body frame 2. The operator seat 3 leans along with the leaning vehicle 1 when the leaning vehicle 1 turns.

The operator seat 3 is a seat on which the operator of the leaning vehicle 1 sits during operation of the leaning vehicle 1. The operator seat 3 has a seating part 3A and a seatback part 3B.

A hip point HP is set in the seating part 3A of the operator seat 3. The hip point HP is generally set on a top face of the seating part 3A at a position slightly further backward than the middle in a leaning-vehicle (1) front-back direction. In the leaning-vehicle (1) front-back direction, the hip point HP approximately corresponds to a center of gravity of the operator sitting on the operator seat 3. The hip point HP is located, for example, at a position of the hip joint of the operator sitting on the operator seat 3 in the leaning-vehicle (1) front-back direction.

The operator seat 3 is disposed between two front wheels 11L, 11R and two rear wheels 12L, 12R in the leaning-vehicle (1) front-back direction. Specifically, the operator seat 3 is disposed at a position where the distance K1 from the hip point HP to a rotational center axis 12L1, 12R1 of each axle of the two rear wheels 12L, 12R is smaller than the distance K2 from the hip point HP to the rotational center axis 11L1, 11R1 of each axle of two front wheels 11L, 11R.

A footrest part 3C on which the operator sitting on the operator seat 3 puts his/her foot is provided in front of the seating part 3A of the operator seat 3.

The rear seat 4 is a seat on which an occupant who does not drive the leaning vehicle 1 sits. The rear seat 4 is disposed behind the operator seat 3. The rear seat 4 has a seating part 4A and a seatback part 4B.

A footrest part 4C on which the occupant sitting on the rear seat 4 puts his/her foot is provided to the left of and to the right of the operator seat 3. The region in the front-back direction where the footrest part 4C for the rear seat 4 is provided is overlapped with a region in the front-back direction where the operator seat 3 is provided as viewed in the leaning-vehicle (1) leftward direction or rightward direction.

Since the operator seat 3 has a seatback part 3B, and the rear seat 4 has a seatback part 4B, respectively, there will be no chance that the back of the operator comes into contact with the chest of the non-driving occupant. However, a riding condition of both the operator and the non-driving occupant is such that, as in the case of riding on a general straddled vehicle, parts of the bodies overlap as viewed in leaning-vehicle (1) leftward direction or rightward direction. Specifically, a part of the leg of the non-driving occupant is located to the side of the torso of the operator. Disposing the footrest part 4C for the rear seat 4 to the left of, and to the right of, the operator seat 3 will obviate the need of providing a footrest space for the non-driving occupant between the operator seat 3 and the rear seat 4. By disposing the operator seat 3 and the rear seat 4 in this way, it is possible to reduce the distance between the front wheels 11L, 11R and the rear wheels 12L, 12F in the leaning-vehicle (1) front-back direction, that is, a wheel base as compared to a general four-wheeled vehicle. As a result of this, it is possible to reduce the length in the front-back direction of the entire leaning vehicle 1.

In the operator seat 3 and the rear seat 4, the upper end of the seating face of each seating part 3A, 4A is located further downward than the upper end of the front wheels 11L, 11R and the upper end of the rear wheels 12L, 12R.

The leaning vehicle 1 includes two front wheels 11L, 11R, a handle bar 22, a steering-force transfer mechanism 60 which transfers steering force inputted into the handle bar 22 to the two front wheels 11L, 11R, a front suspension apparatus 61, and a leaning actuator (not shown).

The two front wheels 11L, 11R each constitute a second wheel. The two front wheels 11L, 11R include a left front wheel 11L as the second left wheel, and a right front wheel 11R as the second right wheel. The right front wheel 11R is provided at a position side-by-side with the left front wheel 11L in the leaning-vehicle (1) left-right direction.

The steering-force transfer mechanism 60 includes a steering shaft 21 having an upper part to which the handle bar 22 is connected, and a tie rod 24. The steering shaft 21 is provided in a middle part in a left-right direction of the body frame 2. The steering shaft 21 is rotatably supported by the head pipe 15. The tie rod 24 connects the steering shaft 21 with the left front wheel 11L and the right front wheel 11R.

When the operator steers the handle bar 22, the steering force thereof is transferred from the steering shaft 21 to the tie rod 24. As a result of this, the right front wheel 11R and the left front wheel 11L, which are steerable wheels, are steered.

The leaning actuator is provided in a front part of the body frame 2. The leaning actuator has a housing and a motor. The housing is fixed to the main frame 16, and an output shaft of the motor is fixed to a center arm (not shown). The leaning actuator outputs auxiliary force so as to assist steering force by the operator. Note that the leaning actuator may be fixed to the center arm, and the output shaft may be fixed to a main frame 16.

The leaning actuator may be used to maintain the leaning vehicle 1 in an upright state at a very low speed. The steering shaft 21 is provided with a steering angle sensor which is not shown. The steering angle sensor detects a steering angle applied to the steering shaft 21 by the operator. A control unit determines a driving command value of the leaning actuator based on inputs such as a steering-angle detection value from the steering sensor, a vehicle speed, and a vehicle leaning angle from an IMU (inertial measurement unit), to control the leaning actuator.

The front suspension apparatus 61 supports the right front wheel 11R and the left front wheel 11L, the front suspension apparatus 61 is supported by the body frame 2 so as to be swingable in an up-down direction. The front suspension apparatus 61 connects the right front wheel 11R with the body frame 2 in a relatively displaceable manner, and connects the left front wheel 11L with the body frame 2 in a relatively displaceable manner. In the present embodiment, since the configuration of the front suspension apparatus 61 is the same as that of the rear suspension apparatus 62 to be described below, detailed description thereof will be omitted.

The leaning vehicle 1 includes two rear wheels 12L, 12R and a rear suspension apparatus 62.

The two rear wheels 12L, 12R are provided further backward than the two front wheels 11L, 11R in the leaning-vehicle (1) front-back direction. The two rear wheels 12L, 12R are provided further backward than the operator seat 3 in the leaning-vehicle (1) front-back direction. The two rear wheels 12L, 12R are provided further backward than the hip point HP of the operator seat 3. The rotational center axis 12L1, 12R1 of each axle of the two rear wheels 12L, 12R is provided further frontward than a center arm 31 (to be described later) included in the rear suspension apparatus 62 in the leaning-vehicle (1) front-back direction. The two rear wheels 12L, 12R are provided further backward than the seating part 4A of the rear seat 4 in the leaning-vehicle (1) front-back direction. The two rear wheels 12L, 12R are provided at a position closer to the hip point HP of the operator seat 3 than the two front wheels 11L, 11R in the leaning-vehicle (1) front-back direction. The rotational center axis 12L1, 12R1 of each axle of the two rear wheels 12L, 12R is provided at a position closer to the hip point HP of the operator seat 3 than the rotational center axis 11L1, 11R1 of each axle of the two front wheels 11L, 11R in the leaning-vehicle (1) front-back direction.

The two rear wheels 12L, 12R include the left rear wheel 12L as a first left wheel and the right rear wheel 12R as a first right wheel. The right rear wheel 12R is provided at a position side-by-side with the left rear wheel 12L in the leaning-vehicle (1) left-right direction.

An electric motor 64 is provided in a hub of the right rear wheel 12R and a hub of the left rear wheel 12L, respectively. The leaning vehicle 1 travels by an electric motor 64 provided in the right rear wheel 12R generating driving force at the right rear wheel 12R, and by an electric motor 64 provided in the left rear wheel 12L generating driving force at the left rear wheel 12L. That is, in the leaning vehicle 1, each of the right rear wheel 12R and the left rear wheel 12L is a driving wheel.

Next, a rear suspension apparatus 62 that supports the rear wheels 12L, 12R will be described.

Note that in the following description, a left part of the rear suspension apparatus 62 or its component is a left half of the length of the rear suspension apparatus 62 or its component when it is halved in the leaning-vehicle (1) left-right direction. A right part of the rear suspension apparatus 62 or its component is a right half of the length of the rear suspension apparatus 62 or its component when it is halved in the leaning-vehicle (1) left-right direction. An upper part of the rear suspension apparatus 62 or its component is an upper half of the length of the rear suspension apparatus 62 or its component when it is halved in the leaning-vehicle (1) up-down direction. A lower part of the rear suspension apparatus 62 or its component is a lower half of the length of the rear suspension apparatus 62 or its component when it is halved in the leaning-vehicle (1) up-down direction.

The rear suspension apparatus 62 supports the right rear wheel 12R and the left rear wheel 12L to the body frame 2 so as to be swingable in an up-down direction. The rear suspension apparatus 62 is a double wishbone suspension (DWB) type suspension apparatus. The rear suspension apparatus 62 connects the right rear wheel 12R and the body frame 2 in a relatively displaceable manner, and also connects the left rear wheel 12L and the body frame 2 in a relatively displaceable manner.

As shown in FIG. 3, the rear suspension apparatus 62 includes a center arm 31 as the connecting member, a right arm 32R, a left arm 32L, a right shock absorber 34R, and a left shock absorber 34L. The right arm 32R has a right upper arm 32Ra and a right lower arm 32Rb. The left arm 32L has a left upper arm 32La and a left lower arm 32Lb.

The center arm 31 is supported by the body frame 2. The center arm 31 is swingable around a center axis Oc extending in the leaning-vehicle (1) front-back direction. That is, the center arm 31 is supported by the body frame 2 as the leaning body in a state of being swingable around the center axis Oc which is a front-back swing-center axis lying along the leaning-vehicle (1) front-back direction.

The center arm 31 is a long-sized member. The center arm 31 extends in a body-frame (2) up-down direction when the leaning vehicle 1 is in an upright state. That is, the center arm 31 extends in the leaning-vehicle (1) up-down direction when the leaning vehicle 1 is in an upright state.

The direction in which the center arm 31 extends is defined as a first direction D1. When the leaning vehicle 1 is in an upright state as shown in FIG. 3, the first direction D1 corresponds to the leaning-vehicle (1) up-down direction.

The center arm 31 has a lower end part as a first end part, and an upper end part as a second end part located further upward than the lower end part.

A swing connecting part 41 is provided in the lower end part of the center arm 31. The center arm 31 is supported at the swing connecting part 41 so as to be swingable around the center axis Oc with respect to the body frame 2.

Here, either one of the center arm 31 or the body frame 2 has a swing support shaft 311 that supports the center arm 31 so as to be swingable around the center axis Oc with respect to the body frame 2. The swing support shaft 311 overlaps with a first line segment SL1 to be described later as viewed in the leaning-vehicle (1) frontward direction or backward direction, as shown in FIG. 3. That is, the center axis Oc which is the swing center of the center arm 31 is located in the vicinity of a third left swing-center axis 46L and the third right swing-center axis 46R, which are to be described below.

A right swing connecting part 42R as a right connecting part to which the right shock absorber 34R is swingably connected, and a left swing connecting part 42L as a left connecting part to which the left shock absorber 34L is swingably connected are provided in the upper end part of the center arm 31. The left swing connecting part 42L is provided to the left of the right swing connecting part 42R. In other words, the right swing connecting part 42R is provided to the right of the left swing connecting part 42L. The left swing connecting part 42L and the right swing connecting part 42R are located further upward than the swing connecting part 41 when the leaning vehicle 1 is in an upright state.

The right rear wheel 12R is supported by a right knuckle arm 45R so as to be rotatable around the rotational center axis 12R1 of the axle. The right part of the right arm 32R supports the right knuckle arm 45R. That is, the right part of the right arm 32R supports the right rear wheel 12R via the right knuckle arm 45R. In other words, the right rear wheel 12R is supported by the right part of the right arm 32R. The left part of the right arm 32R is supported by the body frame 2.

The right part of the right upper arm 32Ra is connected to the upper part of the right knuckle arm 45R so as to be swingable around an axis extending in the leaning-vehicle (1) front-back direction. The left part of the right upper arm 32Ra is connected to the body frame 2 so as to be swingable around the fourth right swing-center axis 49R (see FIG. 4) which is an axis extending in the leaning-vehicle (1) front-back direction.

The right part of the right lower arm 32Rb is connected to the lower part of the right knuckle arm 45R so as to be swingable around an axis extending in the leaning-vehicle (1) front-back direction. The left part of the right lower arm 32Rb is connected to the body frame 2 so as to be swingable around the third right swing-center axis 46R which is an axis extending in the leaning-vehicle (1) front-back direction.

In this way, as a result of the right arm 32R supporting the right rear wheel 12R and the right arm 32R supported by the body frame 2, the right rear wheel 12R leans in a leftward direction when turning left (see FIG. 4), and leans in a rightward direction when turning right, along with the body frame 2. That is, the right rear wheel 12R leans along with the body frame 2 when leaning vehicle 1 turns.

The left rear wheel 12L is supported by the left knuckle arm 45L so as to be rotatable around the rotational center axis 12L1 of an axle. The left part of the left arm 32L supports the left knuckle arm 45L. That is, the left part of the left arm 32L supports the left rear wheel 12L via the left knuckle arm 45L. The right part of the left arm 32L is supported by the body frame 2.

The left part of the left upper arm 32La is connected to the upper part of the left knuckle arm 45L so as to be swingable around an axis extending in the leaning-vehicle (1) front-back direction. The right part of the left upper arm 32La is connected to the body frame 2 so as to be swingable around the fourth left swing-center axis 49L (see FIG. 4) which is an axis extending in the leaning-vehicle (1) front-back direction.

The left part of the left lower arm 32Lb is connected to the lower part of the left knuckle arm 45L so as to be swingable around an axis extending in the leaning-vehicle (1) front-back direction. The right part of the left lower arm 32Lb is connected to the body frame 2 so as to be swingable around the third left swing-center axis 46L which is an axis extending in the leaning-vehicle (1) front-back direction.

In this way, as a result of the left arm 32L supporting the left rear wheel 12L and the left arm 32L supported by the body frame 2, the left rear wheel 12L leans in a leftward direction when turning left (see FIG. 4), and leans in a rightward direction when turning right, along with the body frame 2. That is, the left rear wheel 12L leans along with the body frame 2 when the leaning vehicle 1 turns.

As shown in FIG. 3, a state in which the body frame 2 stands upright as viewed in the leaning-vehicle (1) frontward direction or backward direction is assumed. In this situation, a first line segment SL1 that links the third right swing-center axis 46R, which is the swing center with respect to the body frame 2 of the left part in the right lower arm 32Rb, with the third left swing-center axis 46L, which is the swing center with respect to the body frame 2 of the right part in the left lower arm 32Lb, extends in a direction orthogonal to a center reference line CL to be described later. Here, in the example shown in FIG. 3, the center axis Oc which is the swing center with respect to body frame 2 of the center arm 31 is located on the first line segment SL1. More specifically, the center axis Oc is located at a position bisecting the first line segment SL1. That is, the center axis Oc is located at a position corresponding to a middle point of the first line segment SL1. In short, in the example shown in FIG. 3, the first distance which is a distance from the center axis Oc to the first line segment SL1 is zero.

The right shock absorber 34R is disposed in such a way to extend in a leaning vehicle (1) up-down direction. That is, the right shock absorber 34R has an upper part and a lower part.

The lower part of the right shock absorber 34R is supported by the right arm 32R. Specifically, the lower end part as the first end part of the right shock absorber 34R is connected to an intermediate part in a left-right direction of a right lower arm (32Rb) so as to be swingable around the first right swing-center axis 34R1 which is an axis extending in the leaning-vehicle (1) front-back direction.

The upper part of the right shock absorber 34R is supported by an upper end part of the center arm 31. Specifically, the upper end part as the second end part of the right shock absorber 34R is connected to the right swing connecting part 42R as the right connecting part so as to be swingable around the second right swing-center axis 34R2 which is an axis extending in the leaning-vehicle (1) front-back direction.

That is, in the leaning vehicle 1, among the right upper arm 32Ra and the right lower arm 32Rb, the right shock absorber 34R is connected to the right lower arm 32Rb, and the right shock absorber 34R is not connected to the right upper arm 32Ra.

Here, the second right swing-center axis 34R2 is located at a position different from the first right swing-center axis 34R1 in the leaning-vehicle (1) left-right direction. In other words, the second right swing-center axis 34R2 is located at a position apart from the first right swing-center axis 34R1 in the leaning-vehicle (1) left-right direction. To be more specific, the second right swing-center axis 34R2 is located at a position closer to the center than the first right swing-center axis 34R1 in the leaning-vehicle (1) left-right direction. The straight line linking the first right swing-center axis 34R1 and the second right swing-center axis 34R2 is inclined with respect to the straight line extending in the leaning-vehicle (1) up-down direction as viewed in the leaning-vehicle (1) frontward direction or backward direction. Note that in the leaning vehicle 1, the straight line that links the first right swing-center axis 34R1 and the second right swing-center axis 34R2 corresponds to a right expansion/contraction axis SR to be described later.

The right shock absorber 34R includes an inner tube 47R, an outer tube 48R, and a spring element and a damper element which are not shown. The inner tube 47R and the outer tube 48R are disposed so as to be relatively displaceable along the right expansion/contraction axis SR. The direction in which the inner tube 47R and the outer tube 48R are relatively displaced is defined as a direction in which the right expansion/contraction axis SR extends (right expansion/contraction axis SR direction). The right shock absorber 34R extends in the right expansion/contraction axis SR direction. In the right shock absorber 34R, the spring element and the damper element, which are not shown, restrict relative displacement of the inner tube 47R and the outer tube 48R. As a result of this, the right shock absorber 34R cushions the swing of the right rear wheel 12R with respect to the body frame 2.

The left shock absorber 34L is disposed so as to extend in the leaning-vehicle (1) up-down direction. That is, the left shock absorber 34L has an upper part and a lower part.

The lower part of the left shock absorber 34L is supported by the left arm 32L. Specifically, the lower end part as the first end part of the left shock absorber 34L is connected to an intermediate part in the left-right direction of the left lower arm 32Lb so as to be swingable around the first left swing-center axis 34L1 which is an axis extending in the leaning-vehicle (1) front-back direction.

The upper part of the left shock absorber 34L is supported by the upper end part of the center arm 31. Specifically, the upper end part as the second end part of the left shock absorber 34L is connected to the left swing connecting part 42L as the left connecting part so as to be swingable around the second left swing-center axis 34L2 which is an axis extending in the leaning-vehicle (1) front-back direction.

That is, in the leaning vehicle 1, out of the left upper arm 32La and the left lower arm 32Lb, the left shock absorber 34L is connected to the left lower arm 32Lb, and the left shock absorber 34L is not connected to the left upper arm 32La.

Here, the second left swing-center axis 34L2 is located at a position different from the first left swing-center axis 34L1 in the leaning-vehicle (1) left-right direction. In other words, the second left swing-center axis 34L2 is located at a position apart from the first left swing-center axis 34L1 in the leaning-vehicle (1) left-right direction. More specifically, the second left swing-center axis 34L2 is located at a position closer to the center than the first left swing-center axis 34L1 in the leaning-vehicle (1) left-right direction. A straight line linking the first left swing-center axis 34L1 and the second left swing-center axis 34L2 is inclined with respect to a straight line extending in the leaning-vehicle (1) up-down direction, as viewed in the leaning-vehicle (1) frontward direction or backward direction. Note that in the leaning vehicle 1, the straight line that links the first left swing-center axis 34L1 and the second left swing-center axis 34L2 corresponds to a left expansion/contraction axis SL to be described later.

Moreover, a distance from the second left swing-center axis 34L2 to the second right swing-center axis 34R2 in the leaning vehicle (1) left-right direction is smaller than a distance from the first left swing-center axis 34L1 to the first right swing-center axis 34R1 in the leaning vehicle (1) left-right direction. That is, a spacing (spacing in the leaning vehicle (1) left-right direction) between the straight line linking the first left swing-center axis 34L1 and the second left swing-center axis 34L2, and a straight line linking the first right swing-center axis 34R1 and the second right swing-center axis 34R2 as viewed in the leaning-vehicle frontward direction or backward direction becomes larger in a downward direction than in an upward direction of the leaning vehicle 1.

The left shock absorber 34L includes an inner tube 47L, an outer tube 48L, and a spring element and a damper element, which are not shown. The inner tube 47L and the outer tube 48L are disposed so as to be relatively displaceable along the left expansion/contraction axis SL. The direction in which the inner tube 47L and the outer tube 48L are relatively displaced is defined as a direction in which the left expansion/contraction axis SL extends (left expansion/contraction axis SL direction). The left shock absorber 34L extends in the left expansion/contraction axis SL direction. In the left shock absorber 34L, the spring element and the damper element, which are not shown, restrict relative displacement of the inner tube 47L and the outer tube 48L. As a result of this, the left shock absorber 34L cushions the swing of the left rear wheel 12L with respect to the body frame 2.

Here, as shown in FIGS. 3 and 4, a case in which the leaning vehicle 1 is viewed in a direction in which the center axis Oc extends, that is, in the leaning-vehicle (1) frontward direction or backward direction is assumed.

In this situation, a line segment that links the second left swing-center axis 34L2 (that is, the swing center of the upper end part of the left shock absorber 34L) and the second right swing-center axis 34R2 (that is, the swing center of the upper end part of the right shock absorber 34R) is defined as a third line segment SL3. The middle point of the third line segment SL3 is defined as a middle point M3. Let a distance (that is, a length of the third line segment SL3) from the second left swing-center axis 34L2 (that is, the swing center of the upper end part of the left shock absorber 34L) to the second right swing-center axis 34R2 (that is, the swing center of the upper end part of the right shock absorber 34R) be a sixth distance L6. A distance from the center axis Oc which is the swing center of the center arm 31 to the middle point M3 is defined as a fifth distance L5. Let a straight line that passes through the center axis Oc which is the swing center of the center arm 31 and the middle point M3 be a center reference line CL.

A line segment that links the third right swing-center axis 46R (that is, the swing center with respect to the body frame 2 of the right lower arm 32Rb to which the lower end part as the first end part of the right shock absorber 34R is connected) and the third left swing-center axis 46L (that is, the swing center with respect to the body frame 2 of the left lower arm 32Lb to which the lower end part as the first end part of the left shock absorber 34L is connected) is defined as a first line segment SL1. A middle point of the first line segment SL1 is defined as a middle point M1. A distance (that is, a length of the first line segment SL1) from the third right swing-center axis 46R (that is, the swing center with respect to the body frame 2 of the right lower arm 32Rb to which the lower end part as the first end part of the right shock absorber 34R is connected) to the third left swing-center axis 46L (that is, the swing center with respect to the body frame 2 of the left lower arm 32Lb to which the lower end part as the first end part of the left shock absorber 34L is connected) is defined as a third distance L3 (see FIG. 3).

A distance from the center axis Oc which is the swing center of the center arm 31 to the middle point M1 is defined as a first distance L1. Note that in an example shown in FIGS. 3 and 4, since the center axis Oc is located at a position corresponding to the middle point M1, the first distance L1 is zero. As a result, the first distance L1 is not shown in FIGS. 3 and 4.

A line segment that links the fourth right swing-center axis 49R (that is, the swing center with respect to the body frame 2 of the right upper arm 32Ra to which the lower end part as the first end part of the right shock absorber 34R is not connected) to the fourth left swing-center axis 49L (that is, the swing center with respect to the body frame 2 of the left upper arm 32La to which the lower end part as the first end part of the left shock absorber 34L is not connected) is defined as a second line segment SL2 (see FIG. 4). A middle point of the second line segment SL2 is defined as a middle point M2 (see FIG. 4). A distance from the middle point M1 to the middle point M2 is defined as a second distance L2 (see FIG. 4). A distance (that is, a length of the second line segment SL2) from the fourth right swing-center axis 49R (that is, the swing center with respect to the body frame 2 of the right upper arm 32Ra to which the lower end part as the first end part of the right shock absorber 34R is not connected) to the fourth left swing-center axis 49L (that is, the swing center with respect to the body frame 2 of the left upper arm 32La to which the lower end part as the first end part of the left shock absorber 34L is not connected) is defined as a fourth distance L4.

Moreover, as shown in FIG. 3, when the body frame 2 is standing upright, an acute angle of the angles formed by the right expansion/contraction axis SR with respect to the right lower arm 32Rb is defined as $\alpha 1$, and an acute angle of the angles formed by the left expansion/contraction axis SL with respect to the left lower arm 32Lb is defined as $\beta 1$.

Further, as shown in FIG. 4, when the body frame 2 is leaning, an acute angle of the angles formed by the right expansion/contraction axis SR with respect to the right lower arm 32Rb is defined as $\alpha 2$, and an acute angle of the angles formed by the left expansion/contraction axis SL with respect to the left lower arm 32Lb is defined as $\beta 2$.

In the above described leaning vehicle 1, the center axis Oc which is the swing center with respect to the body frame 2 of the center arm 31 is located on the first line segment SL1 that links the third right swing-center axis 46R which is the swing center with respect to the body frame 2 of the right lower arm 32Rb to which the lower end part as the first end part of the right shock absorber 34R is connected, and the third left swing-center axis 46L which is the swing center with respect to the body frame 2 of the left lower arm 32Lb to which the lower end part as the first end part of the left shock absorber 34L is connected. That is, a first distance which is a distance from the center axis Oc which is the swing center with respect to the body frame 2 of the center arm 31 to the middle point M1 of the first line segment SL1 is zero. For that reason, in the above described leaning vehicle 1, the first distance which is the distance from the center axis Oc which is the swing center with respect to the body frame 2 of the center arm 31 to the middle point M1 of the first line segment SL1 is smaller than the second distance L2 which is the distance from the middle point M1 to the middle point M2. As a result, even when the body frame 2 is leaning in the leaning-vehicle (1) leftward direction or rightward direction, the angle formed by the right expansion/contraction axis SR with respect to the right lower arm 32Rb when the body frame 2 is standing upright is maintained (α1≈α2), and the angle formed by the left expansion/contraction axis SL with respect to the left lower arm 32Lb when the body frame 2 is standing upright is maintained (β1≈β2). More specifically, as follows.

As shown in FIG. 3, when the leaning vehicle 1 is in an upright state, the angle formed by the center reference line CL with respect to the road surface G is about 90 degrees.

When the body frame 2 is leaning in the leaning-vehicle (1) leftward direction, the center arm 31 rotates from the left to the right of the body frame 2 with respect to the body frame 2. As a result of this, as shown in FIG. 4, even when the body frame 2 is leaning in the leaning-vehicle (1) leftward direction, the angle formed by the center reference line CL with respect to the road surface G is kept to be about 90 degrees. That is, in the leaning vehicle 1 of the present embodiment, even when the body frame 2 is leaning in the leaning-vehicle (1) leftward direction, the angle formed by the center reference line CL with respect to the road surface G when the body frame 2 is standing upright is maintained. As a result, even when the body frame 2 is leaning in the leaning-vehicle (1) leftward direction, the angle formed by the right expansion/contraction axis SR with respect to the right lower arm 32Rb when the body frame 2 is standing upright is maintained (α1≈α2), and the angle formed by the left expansion axis SL with respect to the left lower arm 32Lb when the body frame 2 is standing upright is maintained (β1≈β2).

Similarly, when the body frame 2 is leaning in the leaning-vehicle (1) rightward direction, the center arm 31 rotates with respect to the body frame 2 from the right to the left of the body frame 2. Because of this, even when the body frame 2 is leaning in the leaning-vehicle (1) rightward direction, the angle formed by the center reference line CL with respect to the road surface G when the body frame 2 is standing upright is maintained. As a result, even when the body frame 2 is leaning in the leaning-vehicle (1) rightward direction, the angle formed by the right expansion/contraction axis SR with respect to the right lower arm 32Rb when the body frame 2 is standing upright is maintained (α1≈α2), and the angle formed by the left expansion/contraction axis SL with respect to the left lower arm 32Lb when the body frame 2 is standing upright is maintained (β1≈β2).

Note that the phrase "the angle is maintained" means that angle change is within 10° when the body frame 2 has leaned maximally in the leaning-vehicle (1) rightward or leftward direction from its upright state. This angle change is preferably within 5° and more preferably within 3°.

As described above, in the leaning vehicle 1, since the angle of the right expansion/contraction axis SR with respect to the right lower arm 32Rb, and the angle of the left expansion/contraction axis SL with respect to the left lower arm 32Lb are not likely to change (α1≈α2, β1≈β2) when standing upright and when leaning, an expansion and contraction capability of the right shock absorber 34R and the left shock absorber 34L is not likely to change between when standing upright and when leaning. In other words, the expansion and contraction capability of the right shock absorber 34R and the left shock absorber 34L is not likely to change between when the leaning vehicle 1 is running straight and when turning. Therefore, it is possible to suppress significant difference in ride comfort from occurring between ride comfort when the leaning vehicle 1 is running straight and ride comfort when turning.

Although the first distance is zero in the leaning vehicle 1 according to the present embodiment, the first distance L1 does not need to be zero. It is sufficient that the first distance L1 is smaller than the second distance L2. Here, the first distance L1 is preferably smaller than ½ of the second distance L2. The first distance L1 is more preferably smaller than ¼ of the second distance L2.

In the leaning vehicle 1 according to the present embodiment, the first distance L1 is made smaller than the third distance L3. Here, the first distance L1 is preferably smaller than ½ of the third distance L3. The first distance L1 is more preferably smaller than ¼ of the third distance L3. Note that the first distance L1 does not need to be smaller than the third distance L3.

In the leaning vehicle 1 according to the present embodiment, the first distance L1 is made smaller than the sixth distance L6. Here, the first distance L1 is preferably smaller than ½ of the sixth distance L6. The first distance L1 is more preferably smaller than ¼ of the sixth distance L6. Note that the first distance L1 does not need to be smaller than the sixth distance L6.

In the leaning vehicle 1 according to the present embodiment, the sixth distance L6 is made smaller than the fifth distance L5. More specifically, the sixth distance L6 is made not more than a half of the fifth distance L5. Note that the sixth distance L6 does not need to be smaller than the distance L5.

According to the leaning vehicle 1, the lower end part of the left shock absorber 34L is connected to the left arm 32L which supports the left rear wheel 12L, and the upper end part of the left shock absorber 34L is connected to the center arm 31. Moreover, the lower end part of the right shock absorber 34R is connected to the right arm 32R which supports the right rear wheel 12R, and the upper end part of the right shock absorber 34R is connected to the center arm 31. Then, the force received by the left rear wheel 12L from the road surface G is damped by the left shock absorber 34L, thereafter being transferred to the center arm 31, and the force received by the right rear wheel 12R from the road surface G is damped by the right shock absorber 34R, thereafter being transferred to the center arm 31. That is, the force received by the left rear wheel 12L from the road surface G is damped by the left shock absorber 34L before being transferred to the center arm 31, and the force received by the right rear wheel 12R from the road surface G is damped by the right shock absorber 34R before being transferred to the center arm 31.

Here, a distance K3 from the center arm 31 to the hip point HP in the operator seat 3 in the leaning-vehicle (1) front-back direction is larger than a distance K4 from the center arm 31 to the rotational center axis 12L1, 12R1 of each axle of the left rear wheel 12L and the right rear wheel 12R in the leaning-vehicle (1) front-back direction. That is, the operator seat 3 is provided at a position apart from the center arm 31 to which the force received by the left rear wheel 12L from the road surface G and the force received by the right rear wheel 12R from the road surface G are transferred. For that reason, the force that is transferred to the operator seat 3 via the body frame 2 supporting the center arm 31 (that is, the force received by the left rear wheel 12L from the road surface G, which has been damped by the left shock absorber 34L, and the force received by the right rear wheel 12R from the road surface G, which has been damped by the right shock absorber 34R) is further weakened. Therefore, it is possible to improve comfort felt by the operator sitting on the operator seat 3.

The center axis Oc which is the swing center with respect to the body frame 2 of the center arm 31 is located close to the third left swing-center axis 46L which is the swing center with respect to the body frame 2 of the left lower arm 32Lb to which the first end part of the left shock absorber 34L is connected, and the third right swing-center axis 46R which is the swing center with respect to the body frame 2 of the right lower arm 32Rb to which the first end part of the right shock absorber 34R is connected. As a result, an angle of the left expansion/contraction axis SL, which is a straight line extending in an expansion/contraction direction of the left shock absorber 34L, with respect to the left lower arm 32Lb hardly changes between when the body frame 2 is standing upright and when leaning ($\beta1 \approx \beta2$). Similarly, an angle of the right expansion/contraction axis SR, which is a straight line extending in an expansion/contraction direction of the right shock absorber 34R, with respect to the right lower arm 32Rb hardly changes between when the leaning-vehicle 1 is running straight and when turning ($\alpha1 \approx \alpha2$). Therefore, the left shock absorber 34L and the right shock absorber 34R expand and contract respectively in the same manner when the leaning vehicle 1 is running straight and when turning. Thus, in the leaning vehicle 1, it is possible to improve comfort felt by the operator sitting on the operator seat 3 by reducing difference between damping effect by the left shock absorber 34L and the right shock absorber 34R when the leaning vehicle 1 is running straight, and damping effect by the left shock absorber 34L and the right shock absorber 34R when the leaning vehicle 1 is turning.

The first distance L1 is preferably sufficiently small with respect to the second distance L2. The smaller the first distance L1, the smaller the difference between angles ($\alpha1$, $\alpha2$) formed by the right expansion/contraction axis SR with respect to the right lower arm 32Rb between when standing upright and when leaning, and the smaller the difference between angles ($\beta1$, $\beta2$) formed by the left expansion/contraction axis SL with respect to the left lower arm 32Lb between when standing upright and when leaning.

The third distance L3 which is the distance from the swing center with respect to the body frame 2 of the right lower arm 32Rb (third right swing-center axis 46R) to the swing center with respect to the body frame 2 of the left lower arm 32Lb (third left swing-center axis 46L) is preferably as small as possible. The smaller the third distance L3 is, the smaller the difference in the angles ($\alpha1$, $\alpha2$) formed by the right expansion/contraction axis SR with respect to the right lower arm 32Rb between when standing upright and when leaning, and the smaller the difference in the angles ($\beta1$, $\beta2$) formed by the left expansion/contraction axis SL with respect to the left lower arm 32Lb between when standing upright and when leaning.

Figure 5:
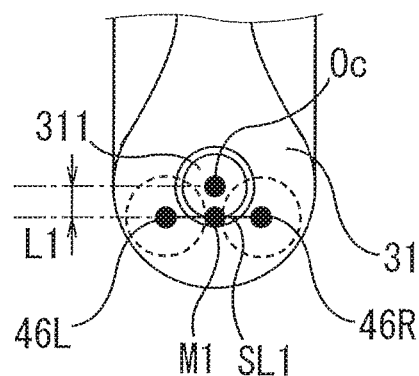
FIG. 5 is a view from arrow A in FIG. 1 in a state in which the leaning vehicle is standing upright, showing a variation of positional relation between the swing center of a center arm and the swing center of each of a left lower arm and a right lower arm.
Figure 6:
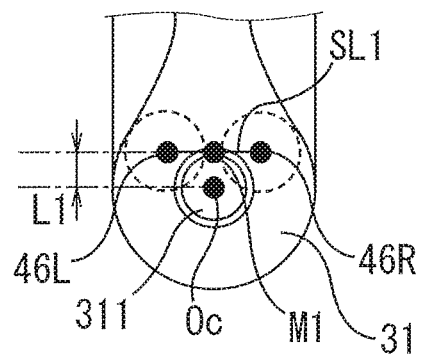
FIG. 6 is a view from arrow A in FIG. 1 in a state in which the leaning vehicle is standing upright, showing another variation of positional relation between the swing center of a center arm and the swing center of each of a left lower arm and a right lower arm.

In the leaning vehicle 1, as shown in FIG. 5, the center axis Oc which is the swing center with respect to the body frame 2 of the center arm 31 may be located above the first line segment SL1 as viewed in the leaning-vehicle (1) frontward direction or backward direction in a state in which the body frame 2 is standing upright. Alternatively, as shown in FIG. 6, the center axis Oc may be located below the first line segment SL1.

Although, in the above described embodiment, an example in which the center arm 31 is one long-sized component has been described, the center arm 31 may be constituted by a plurality of components.

The rear suspension apparatus 62 may be configured to be upside down with respect to the above described embodiment. Specifically, the upper end part of the center arm 31 may be connected to the body frame 2, the right shock absorber 34R may be connected to the lower end part of the center arm 31 and the right upper arm 32Ra, and the left shock absorber 34L may be connected to the lower end part of the center arm 31 and the left upper arm 32La.

In the above described embodiment, although an example in which the present teaching has been applied to a four-wheel leaning vehicle having a right front wheel 11R, a left front wheel 11L, a right rear wheel 12R and a left rear wheel 12L has been described, the present teaching will not be limited to this. The present teaching may be applied to a three-wheel leaning vehicle having one front wheel, and a right rear wheel and a left rear wheel. Alternatively, when the hip point HP of the operator seat is closer to the front wheel than to the rear wheel, the front suspension apparatus may be configured to have the above described particular configuration (the configuration of the rear suspension apparatus 62). In this case as well, the present teaching may be applied to a three-wheel leaning vehicle which has a right front wheel and a left front wheel, and one rear wheel, besides the four-wheel leaning vehicle.

In the above described embodiment, although a configuration in which driving force is given to a rear wheel by an electric motor, the configuration may be such that driving force is given to driving wheels by an internal combustion engine. Moreover, the present teaching may be applied to a leaning vehicle without any power source (such as a vehicle in which an operator sitting on an operator seat actuates pedals).

The above described leaning actuator may assist leaning operation of a vehicle body, a left front wheel, a right front wheel by an operator. The assistance may include a case in which leaning operation is facilitated. The assistance may include a case in which leaning operation is suppressed. Moreover, the leaning actuator may control the leaning operation of a vehicle body, a left front wheel, and a right front wheel, irrespective of the leaning operation of the vehicle body, the left front wheel, and the right front wheel by an operator. For example, when the leaning vehicle is a self-driving vehicle, the leaning actuator may be configured to apply driving force, which is controlled according to input of various sensors, to the vehicle body. The leaning actuator will not be limited by its purpose to provide driving force.

The left upper arm and the left lower arm may each have a fork-shaped end part which is swingably supported by the leaning body. The left upper arm and the left lower arm may each be a bar-like or plate-like member extending in a left-right direction. That is, the left upper arm and the left lower arm respectively may not have a fork-shaped end part which is swingably supported by the leaning body.

The right upper arm and the right lower arm may each have a fork-shaped end part which is swingably supported by the leaning body. The right upper arm and the right lower arm may each be a bar-like or plate-like member extending in a left-right direction. That is, the right upper arm and the right lower arm each may not have a fork-shaped end part which is swingably supported by the leaning body.

The connecting member may be located further backward than the rotational center axis of each axle of the first left wheel and the first right wheel in the leaning-vehicle front-back direction, and may be located further forward than the rotational center axis of each axle of the first left wheel and the first right wheel in the leaning-vehicle front-back direction.

Although, in the above described embodiment, the leaning vehicle 1 includes a rear seat 4, the leaning vehicle of the present teaching may not include the rear seat 4.

Although, in the above described embodiment, the front suspension apparatus 61 has the same structure as that of the rear suspension apparatus 62, the front suspension apparatus 61 does not need to have the same structure as that of the rear suspension apparatus 62. The front suspension apparatus may be, for example, of a strut-type or of a parallel-link type.

In the above described embodiment, each of the third distance L3 and the fourth distance L4 may be zero. Also, the fourth distance L4 may be zero.

FIG. 7 shows an alternative embodiment in which the shock absorbers are connected to the upper arms. In FIG. 7, the reference numbers correspond to the reference numbers of FIGS. 3 and 4, except with regard to the connections of the right shock absorber 34R and the left shock absorber 34L respectively to the right upper arm 32Ra and left upper arm 32La. In FIG. 7, the right shock absorber 34R is connected to the right upper arm 32Ra at axis 34R1, and the left shock absorber 34L is connected to the left upper arm 32La at axis 34L1. In FIG. 7, an acute angle of the angles formed by the right expansion/contraction axis SR with respect to the right upper arm 32Ra is defined as α1, and an acute angle of the angles formed by the left expansion/contraction axis SL with respect to the left upper arm 32Lb is defined as β1.

The term "connection" will not be limited to direct connection. "Connection" may refer to indirect connection. "Indirect connection" means connecting one member with another member via a member other than the two members.

The terms and expressions as used herein are merely for the sake of illustration, and are not intended to be interpreted in a limiting manner. It should be appreciated that the present teaching will not exclude any equivalent features illustrated and stated herein, but will tolerate variations within a range claimed in the present teaching. The present teaching can be embodies in many different forms.

This disclosure should be considered as providing embodiments of the principles of the present teaching. The embodiments are described under the understanding that the present teaching is not intended to be limited to the preferred embodiments described and/or illustrated herein. The teaching is not limited to the embodiments described herein. The present teaching includes all embodiments including equivalent elements, modifications, deletions, combinations, improvements and/or alterations that can be recognized by those skilled in the art based on this disclosure. The limitations of the claims should be interpreted broadly based on the terms used in the claims, and should not be limited to the embodiments set forth in the specification or the prosecution of the present application.

REFERENCE SIGNS LIST

1: Leaning vehicle
2: Body frame
3: Operator seat
11L: Left front wheel (Second wheel, second left wheel)
11R: Right front wheel (Second wheel, second right wheel)
12L: Left rear wheel (First left wheel)
12R: Right rear wheel (First right wheel)
16: Main frame
31: Center arm (connecting member)
32L: Left arm
32R: Right arm
34L: Left shock absorber
34R: Right shock absorber
42L: Left swing connecting part (Left connecting part)
42R: Right swing connecting part (Right connecting part)
61: Front suspension apparatus (Suspension apparatus)
62: Rear suspension apparatus (Suspension apparatus)
G: Road surface
HP: Hip point
L1: First distance
L2: Second distance
Oc: Center axis
SL: Left expansion/contraction axis
SR: Right expansion/contraction axis
α1, α2, β1, β2: Angles

What is claimed is:

1. A leaning vehicle, comprising:
a leaning body that leans in a leaning-vehicle leftward direction when turning left and leans in a leaning-vehicle rightward direction when turning right;
a left arm having a left upper arm and a left lower arm which are swingably supported by the leaning body, and extend from the leaning body in the leaning-vehicle leftward direction;
a right arm having a right upper arm and a right lower arm which are swingably supported by the leaning body, and extend from the leaning body in the leaning-vehicle rightward direction;
a left shock absorber having a first end part connected to the left arm in a state of being swingable around a first left swing-center axis lying along a leaning-vehicle front-back direction;
a right shock absorber having a first end part connected to the right arm in a state of being swingable around a first right swing-center axis lying along a leaning-vehicle front-back direction;
a connecting member which is supported by the leaning body in a state of being swingable around a front-back swing-center axis lying along the leaning-vehicle front-back direction, and connects a second end part of the left shock absorber and a second end part of the right shock absorber to the leaning body, respectively, the connecting member including a left connecting part to which the second end part of the left shock absorber is connected in a state of being swingable around a second left swing-center axis lying along the leaning-vehicle front-back direction, and a right connecting part to which the second end part of the right shock absorber is connected in a state of being swingable around a second right swing-center axis lying along the leaning-vehicle front-back direction;
a first left wheel which is supported by the left arm;
a first right wheel which is supported by the right arm and provided at a position side-by-side with the first left wheel in a leaning-vehicle left-right direction;
a second wheel which is provided in front of, or behind the first left wheel and the first right wheel in the leaning-vehicle front-back direction; and
an operator seat which is supported by the leaning body, and leans along with the leaning body when the leaning vehicle turns, the operator seat being disposed at a position where a hip point is located between the second wheel and both of the first left wheel and the first right wheel in the leaning-vehicle front-back direction, and a distance from the hip point to a rotational center axis of each of axles of the first left wheel and the first right wheel is smaller than a distance from the hip point to a rotational center axis of the axle of the second wheel, wherein
force received by the first left wheel from a road surface is damped by the left shock absorber and is transferred to the operator seat via the connecting member and the leaning body, and
force received by the first right wheel from the road surface is damped by the right shock absorber and is transferred to the operator seat via the connecting member and the leaning body, and wherein the connecting member is formed such that a first distance is smaller than a second distance, wherein
the first distance is a distance from a middle point of a first line segment to the front-back swing-center axis, the front-back swing-center axis being a swing center with respect to the leaning body of the connecting member, the first line segment linking a third left swing-center axis, the third left swing-center axis being a swing center with respect to the leaning body of one of the left upper arm and the left lower arm to which the first end part of the left shock absorber is connected, with a third right swing-center axis, the third right swing-center axis being a swing center with respect to the leaning body of one of the right upper arm and the right lower arm to which the first end part of the right shock absorber is connected, as viewed in a leaning-vehicle frontward or backward direction, and
the second distance is a distance from a middle point of a second line segment to the middle point of the first line segment, the second line segment linking a fourth left swing-center axis, the fourth left swing-center axis being a swing center with respect to the leaning body of another of the left upper arm and the left lower arm to which the first end part of the left shock absorber will not be connected, with a fourth right swing-center axis, the fourth right swing-center axis being a swing center with respect to the leaning body of another of the right upper arm and the right lower arm, to which the first end part of the right shock absorber will not be connected, as viewed in the leaning-vehicle frontward or backward direction, and
the connecting member is disposed at a position where a distance from the connecting member to the hip point of the operator seat is larger than a distance from the connecting member to the rotational center axis of each axle of the first left wheel and the first right wheel, in the leaning-vehicle front-back direction.

2. The leaning vehicle according to claim 1, wherein the connecting member is formed such that the first distance is smaller than a third distance in a state in which the leaning body is standing upright, wherein the third distance is a distance from the third left swing-center axis, the third left swing-center axis being the swing center with respect to the leaning body of the one of the left upper arm and the left lower arm to which the first end part of the left shock absorber is connected, to the third right swing-center axis, the third right swing-center axis being the swing center with respect to the leaning body of the one of the right upper arm and the right lower arm, to which the first end part of the right shock absorber is connected, as viewed in a leaning-vehicle frontward direction or backward direction.

3. The leaning vehicle according to claim 1, wherein the connecting member is supported by the leaning body in the state of being swingable around the front-back swing-center axis in such a way to satisfy the following (1) or (2):
(1) the first end part of the left shock absorber is connected to the left lower arm included in the left arm; the first end part of the right shock absorber is connected to the right lower arm included in the right arm; the third left swing-center axis is a swing center with respect to the leaning body of the left lower arm; and the third right swing-center axis is a swing center with respect to the leaning body of the right lower arm, or
(2) the first end part of the left shock absorber is connected to the left upper arm included in the left arm; the first end part of the right shock absorber is connected to the right upper arm included in the right arm; the third left swing-center axis is a swing center with respect to the leaning body of the left upper arm; and the third right swing-center axis is a swing center with respect to the leaning body of the right upper arm.

4. The leaning vehicle according to claim 1, wherein one of the connecting member and the leaning body has a swing support shaft for supporting the connecting member, the swing support shaft supported by the leaning body in the state of being swingable around the front-back swing-center axis, and
the swing support shaft is overlapped on the first line segment as viewed in the leaning-vehicle frontward direction or backward direction.

5. The leaning vehicle according to claim 1, wherein the front-back swing-center axis is present at a position corresponding to the middle point of the first line segment as viewed in the leaning-vehicle frontward direction or backward direction.

6. The leaning vehicle according to claim 1, wherein the first left wheel and the first right wheel lean in the leaning-vehicle leftward direction when turning left, and lean in the leaning-vehicle rightward direction when turning right, along with the leaning body.

7. The leaning vehicle according to claim 6, wherein the connecting member is formed such that
a fourth distance is smaller than the second distance in a state in which the leaning vehicle is standing upright, the fourth distance being a distance from the second left swing-center axis, the second left swing-center axis being a swing center with respect to the connecting member of the second end part of the left shock absorber to the second right swing-center axis, the second right swing-center axis being a swing center with respect to the connecting member of the second end part of the right shock absorber as viewed in the leaning-vehicle frontward direction or backward direction.

8. The leaning vehicle according to claim 1, wherein the first left wheel and the first right wheel are disposed further backward than the second wheel as viewed in the leaning-vehicle leftward direction or rightward direction.

9. The leaning vehicle according to claim 8, wherein the second wheel is a steerable wheel.

10. The leaning vehicle according to claim 8, wherein the second wheel includes:
a second left wheel, and
a second right wheel which is provided at a position side-by-side with the second left wheel in the leaning-vehicle left-right direction.

11. The leaning vehicle according to claim 1, wherein the connecting member is formed so as to extend in a leaning-vehicle up-down direction in a state in which the leaning body is standing upright, and
the front-back swing-center axis is located further downward than the second left swing-center axis and the second right swing-center axis.

* * * * *